United States Patent [19]

Pintell

[11] 4,068,276
[45] Jan. 10, 1978

[54] PROTECTIVE SYSTEM FOR ELECTRICAL APPLIANCES

[75] Inventor: Robert H. Pintell, New City, N.Y.

[73] Assignee: Interelectronics Corporation, Congers, N.Y.

[21] Appl. No.: 705,107

[22] Filed: July 14, 1976

[51] Int. Cl.² ............................................. H02H 3/28
[52] U.S. Cl. ...................................... 361/46; 361/50; 361/91; 361/92
[58] Field of Search .................... 361/50, 44, 45, 42, 361/46, 47, 48, 49, 90, 91, 92, 77, 86; 340/255, 256, 248 A, 248 B

[56] References Cited

U.S. PATENT DOCUMENTS

| 3,766,434 | 10/1973 | Sherman | 361/50 |
| 3,932,790 | 1/1976 | Muchnick | 361/46 X |
| 3,946,282 | 3/1976 | Weiss et al. | 361/77 |
| 3,961,319 | 6/1976 | Asberry | 361/50 X |
| 3,987,341 | 10/1976 | Clark | 361/50 |
| 3,987,425 | 10/1976 | Lawton | 340/255 X |
| 4,002,968 | 1/1977 | Reid | 340/255 X |

Primary Examiner—J D Miller
Assistant Examiner—Patrick R. Salce
Attorney, Agent, or Firm—Karl F. Ross

[57] ABSTRACT

An a-c power supply for a load such as a household appliance, including a line wire, a neutral wire and a ground wire, has a safety switch and an overload-sensing resistor inserted in its line wire and also comprises a ground-fault detector in the form of a differential transformer with a toroidal core traversed by the line and neutral wires. The safety switch, which may be a manually resettable circuit breaker or an armature of a self-locking relay, has an operating winding in series with an SCR connected between a positive and a negative terminal, one terminal being connected via respective diodes to the line and neutral wires, the other terminal being connected via respective diodes to the neutral and ground wires. The gate circuit of the SCR includes the secondary of the differential transformer, the secondary of another transformer connected across the overload-sensing resistor, a pair of voltage dividers — one inserted between the positive terminal and the neutral wire, the other inserted between the same terminal and the ground wire — for detecting ground loss, neutral loss, line/neutral reversals and excessive neutral-to-ground voltages, and Zener diodes for detecting overvoltages and undervoltages. In a three-phase system, the two terminals are both connected via respective diodes to all three phase wires in parallel. With the use of a pair of triggerable semiconductors (SCRs or triacs) in lieu of a single SCR, the operating winding can be tied directly to the line wire while being connected to the other two wires through the two semiconductors, respectively.

10 Claims, 4 Drawing Figures

PROTECTIVE SYSTEM FOR ELECTRICAL APPLIANCES

FIELD OF THE INVENTION

My present invention relates to a power supply for energizing a household appliance or some other load with single-phase or multi-phase alternating current and, more particularly, to a safety device for cutting off the power upon detecting a malfunction in the supply.

BACKGROUND OF THE INVENTION

A power supply of this type generally includes a line wire, a neutral or return wire, and a ground wire. In a single-phase system, the line wire is connected to the "live" supply terminal and carries a voltage of, usually, 110V; the return wire is theoretically at zero potential but is generally not connected to a local ground. In a three-phase system of the "Δ" type, in which these is no neutral lead, the line and return wires are constituted by different phase leads.

Ground-fault detectors are known which are designed to trip a circuit breaker whenever a dangerous leakage current develops as a result of faulty wiring. These conventional devices, however, protect only against one of several possible malfunctions which may threaten the safety of a human operator or may damage the equipment connected to the power supply.

OBJECTS OF THE INVENTION

The general object of my present invention, therefore, is to provide a protective system for electrical appliances and the like adapted to detect, with the aid of simple circuitry, a variety of possible malfunctions and to switch off the current in response thereto.

A more particular object is to provide a system of this nature comprising a single electronic switchover element triggerable to break the supply circuit in the event of any such malfunction.

SUMMARY OF THE INVENTION

In accordance with my present invention, a shunt circuit connected to the line, return and ground wires of the power supply includes electronic switchover means for the energization of an operating element of a safety device, that device having a normally closed contact in the line wire. The safety device is operable through a control circuit so as to open that contact, the control circuit comprising a first voltage divider inserted in series with a first diode between the line and return wires, a second voltage divider inserted in series with a second diode between the line and ground wires, and a connection with a pair of rectifying branches extending between respective taps of the two voltage dividers and a triggering input of the electronic switchover means, that connection including at least one electronic breakdown element such as a Zener diode. One voltage divider may be omitted in a simplified system.

BRIEF DESCRIPTION OF THE DRAWING

The above and other features of my invention will now be described in detail with reference to the accompanying drawing in which.

SPECIFIC DESCRIPTION

Figure 1:
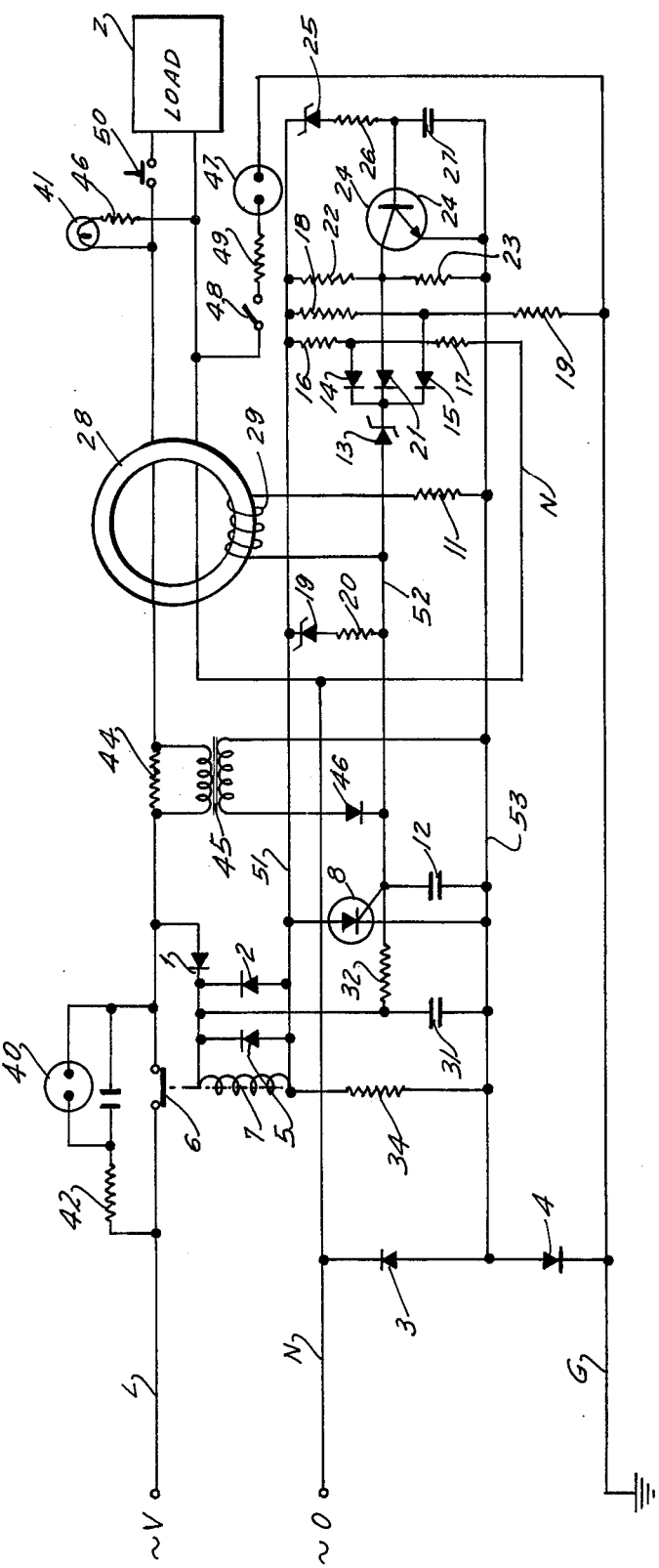
FIG. 1 is a circuit diagram illustrating a protective system according to my invention.

The system shown in FIG. 1 comprises a line wire L, a neutral wire N and a ground wire G. The line and neutral wires are connected, normally, to respective supply terminals assumed to carry a single-phase alternating voltage V (e.g. of 110 volts) and ground potential (zero volts). In practice, the voltage of neutral wire N will usually differ somewhat from that of wire G connected to local ground. Wires L and N are connected across a load Z such as a household appliance.

A circuit breaker 6 is inserted in line wire L and is controlled by a coil 7 lying in series with a thyristor or SCR 8 whose cathode is connected by way of a pair of diodes 3 and 4 to wires N and G, respectively; two other diodes 1 and 2 lie between wire L and coil 7. These four diodes are polarized in aiding relationship with thyristor 8 so as to offer little resistance to the flow of current through that thyristor upon the firing thereof. Another diode 5 is shown connected across coil 7 in bucking relationship with diodes 1 and 2; I have found that such a diode prevents the buildup of potentially harmful voltage peaks across the thyristor.

Three bus bars 51, 52 and 53 extend from the anode, the gate and the cathode of thyristor 8, respectively. A capacitor 12 is connected across bus bars 52 and 53, as is the secondary of a current transformer 45 in series with an isolating diode 46. The primary of current transformer 45 is bridged across a resistor 44 and carries most of the line current; a substantial increase in that line current, indicative of a short circuit to ground or to neutral wire N, fires the thyristor 8 and energizes the coil 7 to open the line wire L at circuit breaker 6, thereby de-energizing the load Z.

Wires L and N also serve as a primary winding of a differential transformer comprising a toroidal core 28 on which a secondary 29 is wound, this secondary being connected between bus bars 52 and 53 in series with a resistor 11. Transformer 28, 29 acts as a ground-fault detector, responding to an unbalance between the current flowing into the load on wire L and the current returning from the load on wire N. Such a ground fault again triggers the thyristor 8 to open the circuit breaker 6.

The use of a damping resistor 11 reduces the frequency selectivity of the resonant circuit 12, 29 and serves to match the input impedance of thyristor 8 for most effective power transfer. The resistor also acts as a shunt for thyristor leakage currents.

An overvoltage-sensing circuit, connected between bus bars 51 and 52, comprises a Zener diode 19 in series with a resistor 20. This circuit fires the thyristor 8 whenever the line voltage exceeds a certain limit such as, for example, 180V.

A circuit for the sensing of undervoltage, which could lead to a malfunction in load Z, includes another Zener diode 13 connected via a diode 21 to the collector of an NPN transistor 24 whose emitter is tied to bus bar 53. The collector is biased by the voltage difference between bus bars 51 and 53, being tied for this purpose to the junction of a pair of resistors 22 and 23 constituting a voltage divider. The base of transistor 24 is connected to bus bar 51 through a resistor 26 in series with a Zener diode 25 and is returned to the emitter by way of a capacitor 27. Under normal operating conditions, transistor 24 is maintained conductive by a positive voltage on bus bar 51 surpassing the threshold of Zener diode 25; this short-circuits the resistor 23 and reversebiases the diode 21. When the line voltage drops below a critical minimum, e.g. 90V, transistor 24 cuts off and Zener diode 13 breaks down so that thyristor 8 fires to open the circuit breaker 6.

In accordance with another important feature of my invention, two further voltage dividers 16, 17 and 18, 19 have the junctions of their resistors connected to Zener diode 13 by way of respective rectifying diodes 14 and 15 in bucking relationship therewith. Voltage divider 16, 17 lies between bus bar 51 and neutral wire N; with the magnitude of resistor 16 substantially exceeding that of resistor 17, the voltage of their junction is normally low so as to prevent a breakdown of Zener diode 13. If, however, neutral wire N becomes disconnected from the low-voltage terminal of the power supply or through a circuit imbalance acquires an excessive potential with reference to ground, the voltage of that wire rises sufficiently to fire the thyristor 8. In an analogous manner, voltage divider 18, 19 lies between bus bar 51 and ground lead G, the magnitude of resistor 18 being also much greater than that of resistor 19. When ground is lost, the voltage of wire G rises and Zener diode 13 breaks down to fire the thyristor 8.

Any accidental reversal of the connections of wires L and N also raises the voltage at the junction point of resistors 16 and 17, causing conduction of thyristor 8 and consequent opening of circuit breaker 6. It should be noted, however, that in this instance the thyristor draws its anode current through diode 2 from wire N, rather than through diode 1 from wire L as in the aforedescribed instances, the circuit being completed through diode 4 to ground rather than through diodes 3 and 4 to neutral and ground as in other cases.

Other elements shown in FIG. 1 include a signal light 40, preferably in the form of a flashing red neon lamp, which is connected across circuit breaker 6 in series with a resistor 42 and in shunt with a capacitor 43 in order to indicate the open-circuit condition in the event of a malfunction. Another lamp 41 (green), connected in series with a resistor 46 across wires L and N, indicates a normal operating condition. A further flashing neon lamp 47 can be connected by a test switch 48 across wires N and G, in series with a resistor 49, to indicate an excessive voltage on wire N even before the load Z is turned on by closure of a master switch 50.

A capacitor 31 connected across the series combination of coil 7 and thyristor 8 allows a charging to higher peak voltages and also stores the energy of positive half-cycles during phase reversals. A resistor 32 forms, together with resistor 11, a voltage divider for prebiasing the gate of the thyristor. Resistor 32 could be replaced by a constant-current device, such as a field-effect transistor, to stabilize that bias in the event of widely fluctuating supply voltages. Another resistor 34, connected across the anode and cathode of the thyristor between bus bars 51 and 53, accelerates the response of the circuit breaker by allowing the flow of a biasing current through coil 7.

The circuit breaker 6, which is manually restorable after having been tripped by an energization of coil 7, may be replaced by an armature of a self-locking relay connected in series with thyristor 8. In that instance the system can be restored to normal, upon correction of the defect, by operating a pushbutton or the like to open the holding circuit of the relay.

Figure 2:
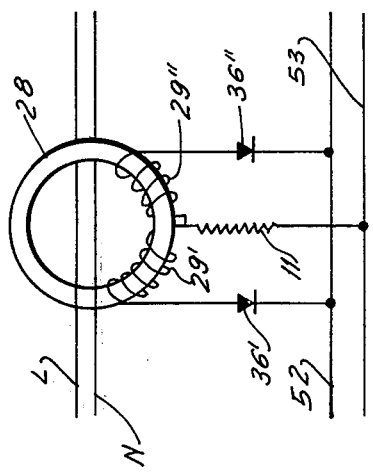
FIG. 2 is a detail view showing a modification.

FIG. 2 shows a single secondary 29 on transformer core 28 replaced by two winding halves 29' and 29" connected in a full-wave rectifying circuit including a pair of diodes 36' and 36" in series therewith. In this case the thyristor 8 is triggerable, in the event of a ground fault, during both positive and negative half cycles of the supply voltage.

Figure 3:
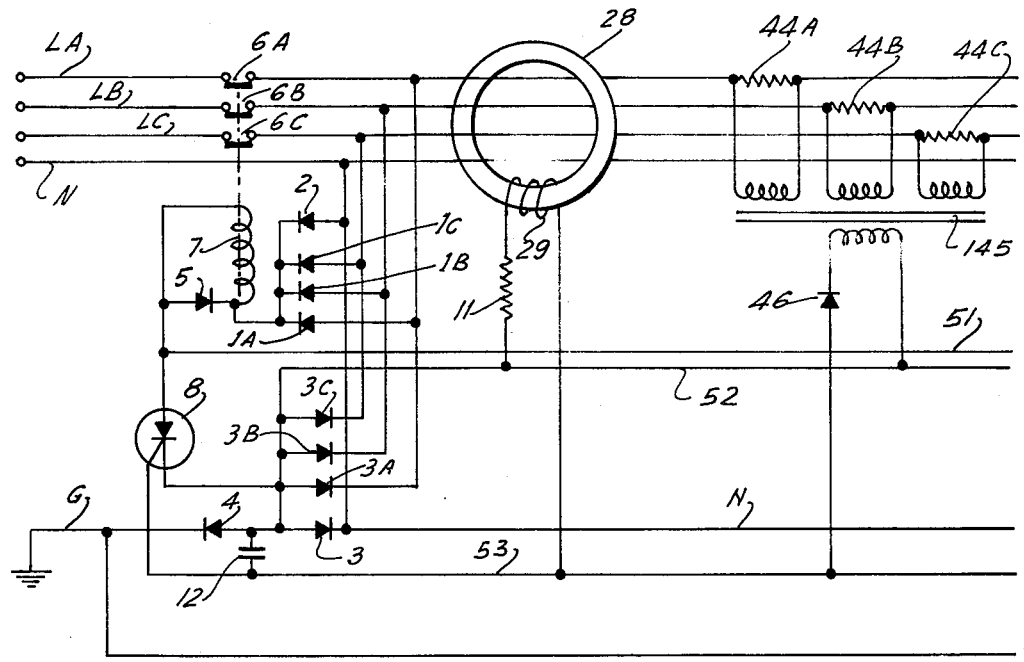
FIGS. 3 and 4 are diagrams showing the adaptation of my invention to a 3-phase power supply.

FIG. 3 shows an adaptation of the system of FIG. 1 (with some elements of that system omitted in this FIGURE) to a 3-phase current supply in Y connection. This single line wire L of FIG. 1 is here replaced by three phase leads LA, LB and LC which are connected to the anode of thyristor 8, by way of coil 7, through respective diodes 1A, 1B and 1C. Each of these phase leads includes a resistor 44A, 44B, 44C in shunt with a respective primary winding of a current transformer 145 serving as a short-circuit detector. Ground lead G is connected by three additional diodes 3A, 3B and 3C to the phase leads LA, LB and LC. The system in otherwise identical with that of FIG. 1 and operates in an analogous manner.

Figure 4:
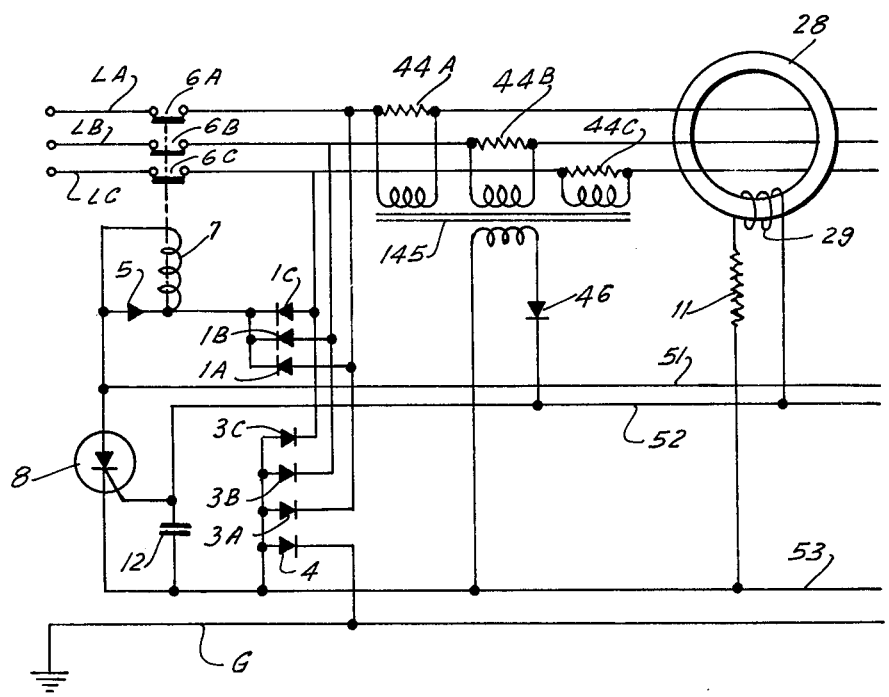

FIG. 4 shows another 3-phase system whose phase leads LA, LB and LC operate in a Δ connection. These phase leads are again connected via respective diodes 1A, 1B and 1C to the series combination of coil 7 and thyristor 8. The cathode of the thyristor, tied to bus bar 53, is connected to ground lead G through diode 4 and to the three phase leads through respective diodes 3A, 3B and 3C as in FIG. 3.

If a bidirectional triggerable semiconductive device such as a triac is substituted for the thyristor or SCR 8, diode 5 will have to be omitted. It is also possible to replace the single thyristor 8 of FIG. 1 by a pair of such thyristors with anodes tied to lead 51 and cathodes respectively connected to leads N and G, eliminating the two diodes 3 and 4. The use of a second thyristor, however, is more expensive than that of the two added diodes.

In a system having only one low-voltage wire N or G, the voltage divider 16, 17 or 18, 19 extending between that low-voltage wire and the high-voltage wire L will fire the electronic switch 8 whenever the low-voltage wire is open-circuited or when the voltages on the two wires are interchanged, thanks to the unsymmetrical positioning of the tap of that divider which lies electrically closer to the low-voltage wire than to the high-voltage wire. With a single voltage divider neither diode 14, 15 will be required between that tap and the breakdown element 13.

The system according to my invention is the subject matter of a Disclosure Document filed Jan. 19, 1976 under Ser. No. 046,233.

I claim:

1. In a power supply for energizing a load with alternating current, including a line wire, a return wire and a ground wire, the combination therewith of a protective system comprising:
 a shunt circuit connected to said line wire, said return wire and said ground wire;
 electronic switchover means in said shunt circuit provided with triggering means;
 a safety device provided with an operating element energizable through said switchover means and with a normally closed contact in said line wire; and
 a control circuit for operating said safety device to open said contact in the event of a malfunction, said control circuit comprising a first voltage divider inserted in series with a first diode between said line wire and said return wire, a second voltage divider inserted in series with a second diode between said line wire and said ground wire, and a connection with a pair of rectifying branches between said triggering means and respective taps of said voltage dividers, said connection including at least one electronic breakdown element.

2. The combination defined in claim 1, further comprising a first terminal connected to said line wire via said first and second diodes, a second terminal, a third diode connecting said second terminal to said return wire, and a fourth diode connecting said second terminal to said ground wire, said switchover means comprising a semiconductive device connected in series with said operating element between said first and second terminals.

3. The combination defined in claim 2 wherein said operating element is a coil, further comprising a fifth diode shunting said coil with a polarity opposing the current flow through said first, second, third and fourth diodes.

4. The combination defined in claim 1 wherein said control circuit further includes an overload-sensing resistor inserted in said line wire and connected across said triggering means.

5. The combination defined in claim 1 wherein said control circuit further comprises a differential transformer with a toroidal core traversed by said line and return wires and with a secondary winding on said core connected across said triggering means.

6. The combination defined in claim 5, further comprising a damping network inserted between said secondary winding and said triggering means.

7. The combination defined in claim 1 wherein said control circuit further includes a voltage-sensing network connected across said switchover means and to said triggering means.

8. The combination defined in claim 7 wherein said voltage-sensing network includes another breakdown element and an impedance in series therewith, said impedance being connected across said triggering means for detecting overvoltages.

9. The combination defined in claim 7 wherein said voltage-sensing network includes another breakdown element, an impedance in series therewith and a transistor with an input connection across said impedance, said transistor being connected across said triggering means for detecting undervoltages.

10. The combination defined in claim 1 wherein said line wire is one of several phase leads of a multiphase power supply, said return wire being another of said phase leads.

* * * * *